(12) United States Patent
Chuang et al.

(10) Patent No.: US 6,359,383 B1
(45) Date of Patent: Mar. 19, 2002

(54) FIELD EMISSION DISPLAY DEVICE EQUIPPED WITH NANOTUBE EMITTERS AND METHOD FOR FABRICATING

(75) Inventors: Feng-Yu Chuang; Wen-Chun Wang, both of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/377,315

(22) Filed: Aug. 19, 1999

(51) Int. Cl.$^7$ .................................................. H01J 63/04
(52) U.S. Cl. ........................ 313/496; 313/495; 313/310; 313/309
(58) Field of Search ................................ 313/495, 496, 313/497, 309, 310, 311, 336, 351; 445/24, 25, 50, 51

(56) References Cited

U.S. PATENT DOCUMENTS

| | | | |
|---|---|---|---|
| 5,320,913 A | * | 6/1994 | Morimoto et al. ........... 313/503 |
| 5,726,524 A | * | 3/1998 | Debe .......................... 313/310 |
| 5,821,132 A | * | 10/1998 | Song et al. .................... 438/22 |
| 5,872,422 A | * | 2/1999 | Xu et al. ...................... 313/495 |
| 5,948,465 A | * | 9/1999 | Blanchet-Fincher et al. .. 445/50 |
| 6,020,677 A | * | 2/2000 | Blanchet-Fincher et al. ..... 313/309 |
| 6,057,637 A | * | 5/2000 | Zettl et al. ................... 313/310 |
| 6,143,412 A | * | 11/2000 | Schueller et al. ........... 428/408 |

* cited by examiner

Primary Examiner—Michael H. Day
Assistant Examiner—Joseph Williams
(74) Attorney, Agent, or Firm—Tung & Associates

(57) ABSTRACT

A field emission display device utilizing a nanotube emitter layer instead of microtips and a method for fabricating such device by a thick film printing technique instead of thin film deposition and photolithographic methods are provided. In the device, various layers of materials including a layer of nanotube emitter material can be formed by a thick film printing technique on a glass plate. The nanotube emitter material can be nanotubes of carbon, diamond or a diamond-like carbon material that is mixed with a solvent-containing paste. The resulting paste has a consistency suitable for a thick film printing process. The nanotubes should have diameters between about 30 nanometers and about 50 nanometers for use in the present invention device. The screen printing or the thick film printing method of the present invention can be carried out at substantially lower cost than the thin film deposition and photolithographic methods. Furthermore, no size limit is imposed in the thick film printing technique in contrast to a substrate size limit due to a deposition chamber used in a thin film deposition process. The present invention novel method is especially suitable for the fabrication of large-size FED screens.

14 Claims, 2 Drawing Sheets

FIELD EMISSION DISPLAY DEVICE EQUIPPED WITH NANOTUBE EMITTERS AND METHOD FOR FABRICATING

FIELD OF THE INVENTION

The present invention generally relates to a field emission display (FED) device and a method for fabricating such device and more particularly, relates to a field emission display device that utilizes nanotube emitters instead of microtips as the electron emission source and a method for fabricating such FED device by a thick film printing technique.

BACKGROUND OF THE INVENTION

In recent years, flat panel display devices have been developed and widely used in electronic applications such as personal computers. One of the popularly used flat panel display device is an active matrix liquid crystal display which provides improved resolution. However, the liquid crystal display device has many inherent limitations that render it unsuitable for a number of applications. For instance, liquid crystal displays have numerous fabrication limitations including a slow deposition process for coating a glass panel with amorphous silicon, high manufacturing complexity and low yield for the fabrication process. Moreover, the liquid crystal display devices require a fluorescent backlight which draws high power while most of the light generated is wasted. A liquid crystal display image is also difficult to see under bright light conditions or at wide viewing angles which further limit its use in many applications.

Other flat panel display devices have been developed in recent years to replace the liquid crystal display panels. One of such devices is a field emission display device that overcomes some of the limitations of LCD and provides significant advantages over the traditional LCD devices. For instance, the field emission display devices have higher contrast ratio, larger viewing angle, higher maximum brightness, lower power consumption and a wider operating temperature range when compared to a conventional thin film transistor (TFT) liquid crystal display panel.

One of the most drastic difference between a FED and a LCD is that, unlike the LCD, FED produces its own light source utilizing colored phosphors. The FEDs do not require complicated, power-consuming backlights and filters and as a result, almost all the light generated by a FED is visible to the user. Furthermore, the FEDs do not require large arrays of thin film transistors, and thus, a major source of high cost and yield problems for active matrix LCDs is eliminated.

In a FED, electrons are emitted from a cathode and impinge on phosphors on the back of a transparent cover plate to produce an image. Such a cathodoluminescent process is known as one of the most efficient methods for generating light. Contrary to a conventional CRT device, each pixel or emission unit in a FED has its own electron source, i.e., typically an array of emitting microtips. A voltage difference existed between a cathode and a gate extracts electrons from the cathode and accelerates them toward the phosphor coating. The emission current, and thus the display brightness, is strongly dependent on the work function of the emitting material. To achieve the necessary efficiency of a FED, the cleanliness and uniformity of the emitter source material are therefore very important.

In order for the electron to travel in a FED, most FEDs are evacuated to a low pressure such as $10^{-7}$ torr, in order to provide a log mean free path for the emitted electrons and to prevent contamination and deterioration of the microtips. The resolution of the display can be improved by using a focus grid to collimate electrons drawn from the microtips.

In the early development for field emission cathodes, a metal microtip emitter of molybdenum was utilized. In such a device, a silicon wafer is first oxidized to produce a thick silicon oxide layer and then a metallic gate layer is deposited on top of the oxide. The metallic gate layer is then patterned to form gate openings, while subsequent etching of the silicon oxide underneath the openings undercuts the gate and creates a well. A sacrificial material layer such as nickel is deposited to prevent deposition of nickel into the emitter well. Molybdenum is then deposited at normal incidence such that a cone with a sharp point grows inside the cavity until the opening closes thereabove. An emitter cone is left when the sacrificial layer of nickel is removed.

In an alternate design, silicon microtip emitters are produced by first conducting a thermal oxidation on silicon and then followed by patterning the oxide and selectively etching to form silicon tips. Further oxidation or etching protects the silicon and sharpens the point to provide a sacrificial layer. In another alternate design, the microtips are built onto a substrate of a desirable material such as glass, as an ideal substrate for large area flat panel display. The microtips can be formed of conducting materials such as metals or doped semi-conducting materials. In this alternate design for a FED device, an interlayer that has controlled conductivity deposited between the cathode and the microtips is highly desirable. A proper resistivity of the interlayer enables the device to operate in a stable condition. In fabricating such FED devices, it is therefore desirable to deposit an amorphous silicon film which has electrical conductivity in an intermediate range between that of intrinsic amorphous silicon and $n^+$doped amorphous silicon. The conductivity of the $n^+$doped amorphous silicon can be controlled by adjusting the amount of phosphorous atoms contained in the film.

Generally, in the fabrication of a FED device, the device is contained in a cavity of very low pressure such that the emission of electrons is not impeded. For instance, a low pressure of $10^{-7}$ torr is normally required. In order to prevent the collapse of two relatively large glass panels which form the FED device, spacers must be used to support and provide proper spacing between the two panels. For instance, in conventional FED devices, glass spheres or glass crosses have been used for maintaining such spacings in FED devices. Elongated spacers have also been used for such purpose.

Referring initially to FIG. 1A wherein an enlarged, cross-sectional view of a conventional field emission display device 10 is shown. The FED device 10 is formed by depositing a resistive layer 12 of typically an amorphous silicon base film on a glass substrate 14. An insulating layer 16 of a dielectric material and a metallic gate layer 18 are then deposited and formed together to provide metallic microtips 20 a cathode structure 22 is covered by the resistive layer 12 and thus, a resistive but somewhat conductive amorphous silicon layer 12 underlies a highly insulating layer 16 which is formed of a dielectric material such as $SiO_2$. It is important to be able to control the resistivity of the amorphous silicon layer 12 such that it is not overly resistive but yet, it will act as a limiting resistor to prevent excessive current flow if one of the microtips 20 shorts to the metal layer 18.

A completed FED structure 30 including anode 28 mounted on top of the structure 30 is shown in FIG. 1B. It is to be noted, for simplicity reasons, the cathode layer 22 and the resistive layer 12 are shown as a single layer 22 for the cathode. The microtips 20 are formed to emit electrons 26 from the tips of the microtips 20. The gate electrodes are provided with a positive charge, while the anode 28 is provided with a higher positive charge. The anode 28 is formed by a glass plate 36 which is coated with phosphorous particles 32. An intermittent conductive layer of indium-tin-oxide layer 34 may also be utilized to further improve the brightness of the phosphorous layer when bombarded by electrons 26. This is shown in a partial, enlarged cross-sectional view of FIG. 1C. The total thickness of the FED device is only about 2 mm, with vacuum pulled inbetween the lower glass plate 14 and the upper glass plate 36 sealed by sidewall panels 38 (shown in FIG. 1B).

The conventional FED devices formed by microtips shown in FIGS. 1A–1C produces a flat panel display device of improved quality when compared to liquid crystal display devices. However, a major disadvantage of the microtip FED device is the complicated processing steps that must be used to fabricate the device. For instance, the formation of the various layers in the device, and specifically the formation of the microtips, requires a thin film deposition technique utilizing a photolithographic method. As a result, numerous photomasking steps must be performed in order to define and fabricate the various structural features in the FED. The CVD deposition processes and the photolithographic processes involved greatly increase the manufacturing costs of a FED device.

It is therefore an object of the present invention to provide a FED device that does not have the drawbacks and shortcomings of the conventional FED devices.

It is another object of the present invention to provide a FED device that is not fabricated by thin film deposition techniques and photolithographic masking techniques.

It is a further object of the present invention to provide a FED device that can be fabricated by a low cost thick film printing technique.

It is another further object of the present invention to provide a FED device that can be fabricated by a screen printing technique and screens for printing various patterns of material layers.

It is still another object of the present invention to provide a FED device that contains a nanotube emitter layer of nanotubes of carbon, diamond or diamond-like carbon.

It is yet another object of the present invention to provide a FED device that contains a multiplicity of emitter stacks insulated by insulating rib sections of a dielectric material.

It is still another further object of the present invention to provide a method for fabricating a FED device by a thick film printing technique in which a nanotube emitter material is screen printed on a high electrical resistivity layer to form a multiplicity of spaced-apart emitter stacks.

It is yet another further object of the present invention to provide a method for fabricating a FED device by using a thick film printing technique to form a cathode layer, a resistivity layer, a nanotube emitter layer, a dielectric layer filling the gaps between the emitter stacks, a dielectric layer on top of the emitter stacks, and a conductive metal layer as the gate electrode.

SUMMARY OF THE INVENTION

In accordance with the present invention, a field emission display device and a method for fabricating such device are disclosed.

In a preferred embodiment, a field emission display device is provided which includes a first electrically insulating plate, a cathode formed on the first electrically insulating plate of a material that includes silver, a layer formed on the cathode of a high electrical resistivity material, a layer of nanotube emitter on the resistivity layer formed of a material selected from the group consisting of carbon, diamond and diamond-like carbon; the cathode, the resistivity layer and the nanotube emitter layer form an emitter stack insulated by an insulating rib section from adjacent emitter stacks, a dielectric material layer perpendicularly over flying a multiplicity of emitter stacks, a gate electrode on top of the dielectric material layer, and an anode formed on a second electrically insulating plate overlying the gate electrode.

In the field emission display device, the first electrically insulating plate may be a glass plate and the second electrically insulating plate may be a phosphor coated glass plate. The cathode may be formed of a layer of silver paste. The high electrical resistivity material may be $RuO_2$. The nanotube emitter layer may be formed of a carbon paste that includes between 20 wt % and 80 wt % of carbon and the remainder of a solvent-containing binder, or about 50 wt % carbon and about 50 wt % solvent-containing binder. The nanotube emitter layer may further include a carbon paste that has about 50 wt % carbon fibers having diameters between about 30 nanometer and about 50 nanometer and about 50 wt % solvent-containing binder.

In the field emission display device, the emitter stack may have a thickness between about 10 $\mu$m and about 100 $\mu$m, and preferably between about 20 $\mu$m and about 40 $\mu$m. The insulating rib section may have a thickness substantially similar to a thickness of the emitter stack. The insulating rib section may be formed of a dielectric material such as a glass frit. The dielectric material overlying the multiplicity of emitter stacks may include glass powder and a solvent. The gate electrode may be formed of a silver paste. The dielectric material layer perpendicularly overlying a multiplicity of emitter stacks may have a width of about 150 $\mu$m, the gate electrode on top of the dielectric material layer may have a width of about 110 $\mu$m, and the nanotube emitter layer not overlaid by the dielectric material layer may have a width of about 120 $\mu$m and a length of about 110 $\mu$m.

The present invention is further directed to a method for fabricating a field emission display device by a thick film printing technique which can be carried out by the operating steps of providing a first electrically insulating plate, screen printing an electrically conductive plate on the first electrically insulating plate forming a cathode, screen printing a layer of high electrical resistivity material on top of the first electrically insulating plate, screen printing a nanotube emitter material on the high electrical resistivity material layer forming a multiplicity of spaced-apart emitter stacks with gaps thereinbetween, screen printing a layer of insulating material in the gaps forming insulating rib sections, screen printing a layer of dielectric material in elongated strips overlying and perpendicularly intersecting the multiplicity of spaced-apart emitter stacks, screen printing a layer of electrically conductive material in elongated strips on top of the layer of dielectric material forming gate electrode, and mounting an anode formed on a second electrically insulating plate overlying the layer of electrical conductive material.

In the method for fabricating a field emission display device by a thick film printing technique, the first electrically insulating plate may be a glass plate that is substantially transparent. The method may further include the step of screen printing the electrically conductive paste in a silver paste on a glass plate to form a cathode. The method may further include the step of screen printing a layer of $RuO_2$ on top of the first electrically insulating plate as the high electrical resistivity material. The method may further include the step of forming the nanotube emitter material with carbon at between about 20 wt % and about 80 wt % and a solvent-containing binder for the remainder.

The method for fabricating a field emission display device by a thick film printing technique may further include the step of forming the nanotube emitter material with about 50 wt % of carbon fibers that have diameters of between about 30 and about 50 nanometers and about 50 wt % of a solvent-containing binder. The method may further include the step of forming the emitter stack to a total thickness between about 20 µm and about 40 µm. The method may further include the step of forming the insulating rib sections to a thickness substantially similar to a thickness of the emitter stack, or the step of screen printing elongated strips of the layer of dielectric material on top of the multiplicity of emitter stacks by a material including a glass powder and a solvent. The method may further include the step of forming the gate electrode with a silver paste, or the step of forming the anode on a phosphor coated plate.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1A:
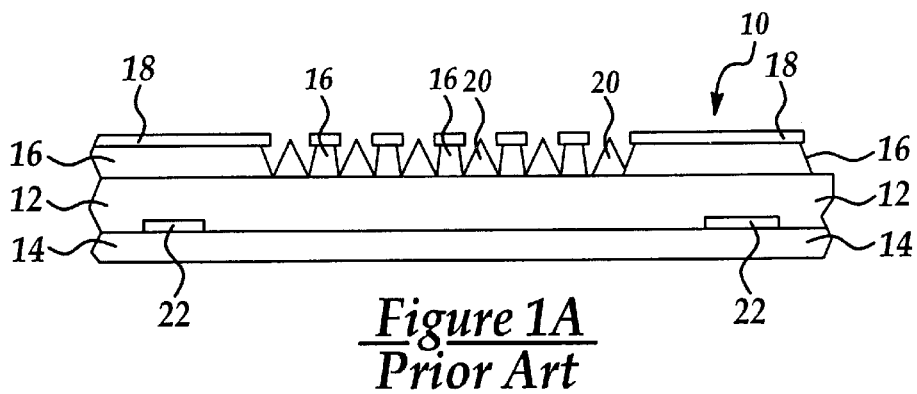
FIG. 1A is an enlarged, cross-sectional view of a conventional field emission display device utilizing microtips.
Figure 1B:
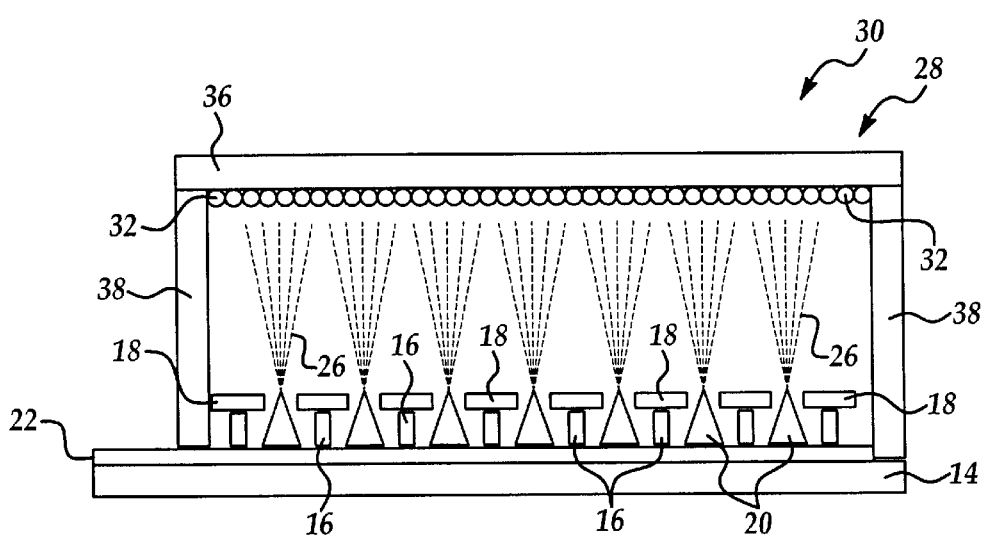
FIG. 1B is an enlarged, cross-sectional view of the conventional field emission display device of FIG. 1A further including an anode and sidewall panels forming a sealed chamber.
Figure 1C:
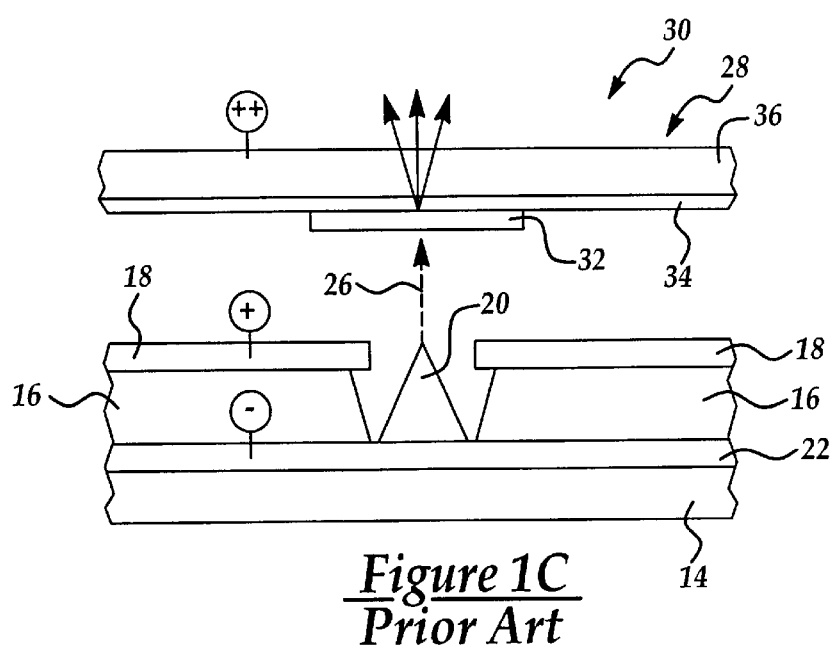
FIG. 1C is an enlarged, partial cross-sectional view of the conventional field emission display device of FIG. 1B illustrating the structure of a microtip.

The present invention discloses a field emission display device that utilizes a nanotube emitter material as the electron emitter without using microtips of the conventional FED devices. The present invention is further directed to a fabrication method for making a field emission display device by a thick film printing technique such that the conventional methods of thin film deposition and photolithographic patterning are not necessary.

The present invention novel FED device presents several major benefits over the conventional FED devices. First, only a thick film printing technique is necessary for fabricating the device and thus the fabrication process can be carried out at lower low cost without requiring the complicated processing steps of thin film deposition and photolithographic methods. Secondly, the present invention novel device utilizes a nanotube emitter material which can be provided in a paste form and applied by a low cost screen printing method. Thirdly, the present invention novel device utilizes a rib structure for insulating nanotube emitters which is also formed by a thick film printing technique. Fourthly, there is no size limitation in the screen printing technique for making the present invention novel device. The present invention novel method is therefore suitable for fabricating any size screens without limitation when compared to conventional FED fabrication methods.

The present invention utilizes a novel new material of a nanotube of carbon, diamond or diamond-like carbon material. The nanotubes have diameters smaller than those of fibers, i.e., in the range of less than 100 nanometers, or preferably in the range between about 30 and about 50 nanometers. The nanotubes are first grown, fractured into shirt lengths and then mixed with a paste material that contains solvent to form a screen-printable paste. The nanotube emitter material can be applied in a thick film printing technique at substantially lower cost than thin film deposition and photolithographic methods.

In a typical present invention novel structure, a pixel can be fabricated with the gate electrode and the cathode formed in perpendicular directions overlaying each other with insulation thereinbetween. Between the red, green and blue regions, insulating rib sections that have the same height as the electron emission regions are utilized for achieving electrical insulation between the nanotube emitters.

In the fabrication process, a thick film printing technique is utilized to screen print on a glass substrate a thick film of a conductive paste such as a silver paste for use as the cathode. On top of the silver paste, is then covered with a resistivity layer and a nanotube emitter layer which contains sharp points or sharp nanotubes formed of an electrically conductive material such as carbon, diamond or diamond-like carbon in a paste for use as the field electron emission source. Between the nanotube emitter stacks, a dielectric material such as a glass frit is used to form ribs and to fill in the gaps as an electrical insulation layer by a thick film printing technique. The height of the rib sections is substantially the same as the nanotube emitter stacks. Between the gate electrode and the nanotube emitter layer, a dielectric material such as glass frit is screen printed for electrical insulation. The voltage required for the field strength of the electron field emission is determined by the thickness of the dielectric material layer.

The electron emission source can be formed by materials that typically have low field emission characteristics, for instance, diamond, diamond-like carbon or carbon nanotubes. These electrically conductive materials can be suitably mixed with a paste material and be used in a mass-produceable thick film printing technique. After the paste material is printed on a substrate for the FED device, the device is hardbaked such that the emission points or the sharp points of the nanotubes are exposed on the surface of the nanotube emitter layer. The present invention therefore provides a low cost method for making FED devices and furthermore, a method for fabricating nanotube emitter materials.

Figure 2:
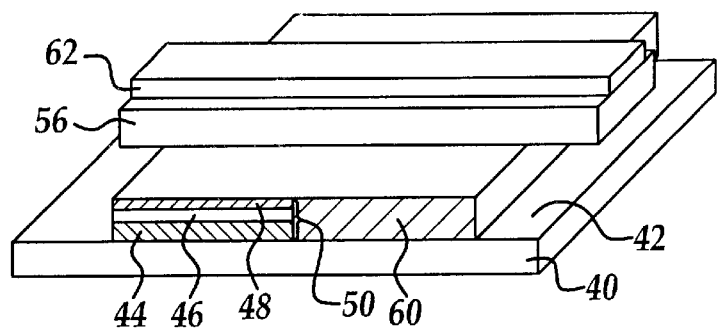
FIG. 2 is a perspective view of a present invention field emission display device illustrating the cathode layer, the resistivity layer, the nanotube emitter layer, the dielectric material layer and the gate electrode.

Referring now to FIG. 2 wherein a perspective view of the various layers of materials deposited in forming the present invention novel FED device is shown. At the beginning of the process, an electrically insulating plate 40 such as a glass plate is first provided. On a top surface 42 of the glass plate 40 is then screen printed by a thick film printing technique a layer 44 of an electrically conductive material such as a silver paste. The elongated strip of silver paste is printed in a transverse direction to the glass plate 40 forming a cathode for the FED device. A suitable thickness of the silver paste printed may be between about 5 μm and about 20 μm, and preferably about 10 μm. The screen printing method is conducted by using a screen that is provided with a pattern for a multiplicity of cathodes and for a multiplicity of pixels to be formed on the FED device. Based on the dimensions of the cathode, i.e., a width of approximately 110 μm, the mask or screen provided can be easily fabricated.

On top of the cathode 44 formed by the silver paste, it is then screen printed an elongated strip of a high resistivity material such as $RuO_2$. The thickness of the resistivity layer 46 is important for providing sufficient insulation between the cathode and the subsequently deposited nanotube emitter layer on top of the resistivity layer 46.

One of the novel features of the present invention device, i.e., the nanotube emitter layer 48 is then deposited by a screen printing technique on top of the high resistivity layer 46. The nanotube emitter layer can be suitably formed of carbon nanotubes, diamond nanotubes or diamond-like carbon nanotubes that are fractured and mixed with a solvent-containing paste in a consistency that is suitable for thick film printing technique. Any other suitable nanotube materials, as long as having a suitable diameter such as between about 30 and about 50 nanometers may also be used. It should be noted that the nanotubes are formed in columnar shape and are normally smaller than the diameter of a fiber. A smaller operating voltage of between about 30 volts and about 50 volts is used to activate the nanotube emitter materials for emitting electrons. This is significantly smaller than an operating voltage of larger than 100 volts which is normally required for operating the microtips in a conventional FED device.

After the nanotube emitter layer is screen printed on the FED substrate, i.e., on the glass plate 40, the layer is hardbaked to drive out residual solvents contained in the paste and to cure the material. The nanotube emitter material normally contains between about 20 wt % and about 80 wt % of the nanotubes while the remainder is a solvent-containing binder. Preferably, the nanotube paste contains about 50 wt % nanotubes and about 50 wt % of a solvent-containing binder. After the hardbake process, tips or sharp points of the nanotubes protrude above the surface of the nanotube layer for use as electron emission sources and to enable the present invention novel device. The cathode 44, the high resistivity layer 46 and the nanotube emitter material layer 48 form an emitter stack 50. A multiplicity of the emitter stacks 50 is formed on the glass plate 40 in the transverse direction in a spaced-apart relationship leaving a gap of approximately 110 μm thereinbetween.

In the next step of the present invention novel method, a gap-filling process by a dielectric material is conducted by a screen printing method such that a smooth surface is obtained after all the gaps are filled between the multiplicity of emitter stacks. A multiplicity of rib sections 60 is thus formed. The dielectric material used in forming the rib sections 60 can be any suitable insulating material such as a glass frit or a glass powder.

Figure 3:
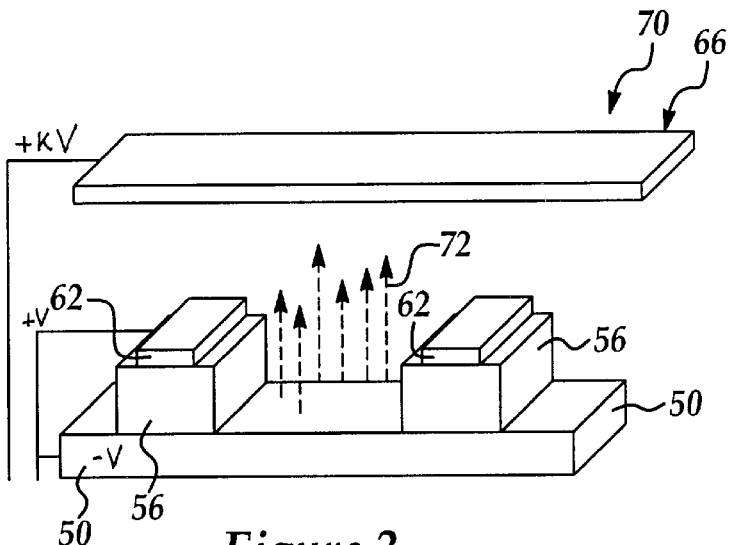
FIG. 3 is a perspective view of the present invention field emission display device of FIG. 2 with an anode of a phosphor coated plate positioned on top.

Along the longitudinal direction of the glass plate 40, is then formed by a screen printing method an elongated strip of dielectric material for insulating the emitter stack 50. The dielectric material layer 56 overlaps a multiplicity of emitter stacks 50 perpendicularly. This is also shown in FIG. 3, and in FIG. 4 in a plane view. A suitable width of the dielectric material layer 56 is approximately 150 μm, as shown in FIG. 4.

Figure 4:
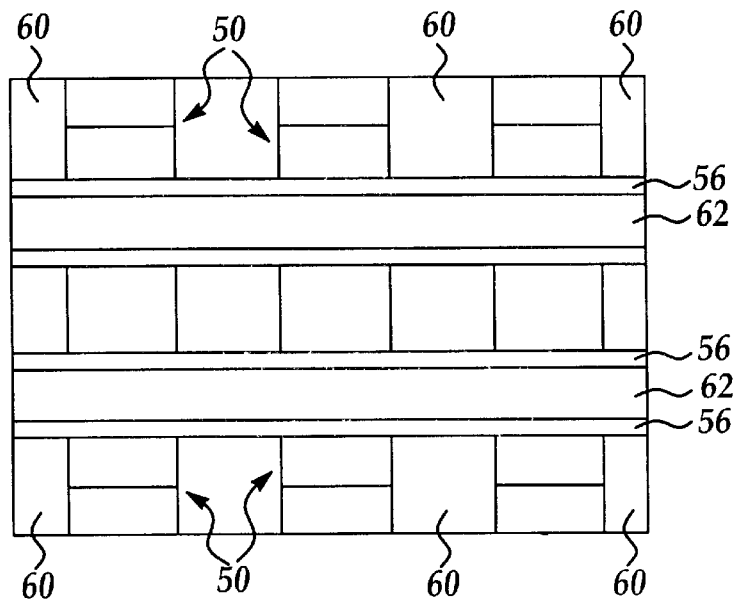
FIG. 4 is a plane view of the present invention field emission display device of FIG. 2 illustrating a pixel.

Deposited on top of the dielectric material 56, to a narrower width is a layer of gate electrode material 62, for instance, to a width of about 110 μm as shown in FIG. 4. The gate electrode material can be screen printed by a thick film printing technique by a metallic material that has high electrical conductivity. A suitable metallic material for the screen printing method is a silver paste that contains at least 50 wt % silver particles. On top of the present invention novel FED device 70, as shown in FIG. 3, is then mounted an anode 66, or a phosphor plate which is formed by depositing phosphor on a glass plate. The mounting of the anode is achieved by utilizing a plurality of vertically mounted sidewall panels (not shown) to form a vacuum cavity for the present invention FED device 70. Electrons 72 emitted from the emitter stacks 50 toward the gate electrodes 62 and the anode 66 to achieve the display function of a FED device.

FIG. 4 is a plane view of a present invention FED device 70 illustrating one pixel. It is seen that the emitter stacks 50 are each designated as red (R), green (G) and blue (B). The emission of electrons are blocked by the dielectric layer 56 arranged in the longitudinal direction. It is also illustrated that the rib sections 60 provide insulation between the emitter stacks 50. For the pixel shown in FIG. 4, a dimension of approximately 660 μm×660 μm in substantially a square shape is provided.

The present invention novel device and method for fabricating such device by thick film printing technique have therefore been amply described in the above descriptions and in the appended drawings of FIGS. 2~4. The present invention novel device and method allows a low cost thick film printing technique to be used instead of a conventional thin film deposition and photolithographic method. The present invention further allows the use of nanotube emitter materials for forming an electron emission source instead of using microtips. The present invention further provides the use of rib sections for insulation between the emitter stacks and a method for forming the rib sections by a screen printing technique. By utilizing the present invention novel method, no size limit is imposed on the FED device fabricated since very large screens can be printed by the thick film printing technique.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A field emission display device comprising:
   a first electrically insulating plate,
   a cathode formed of a material comprises metal on said first electrical insulating plate,
   a layer formed of a high electrical resistivity material on said cathode,
   a layer of nanotube emitter formed of a material selected from the group consisting of carbon, diamond and diamond-like carbon on said high electrical resistivity layer; said cathode, said high electrical resistivity layer and said nanotube emitter layer form an emitter stack with said nanotube emitter layer exposed, said emitter stack being insulated by an insulating rib section from adjacent emitter stacks,
   a dielectric material layer perpendicularly overlying a multiplicity of emitter stacks, a gate electrode on top of said dielectric material layer, and an anode formed on a second electrically insulating plate overlying said gate electrode.

2. A field emission display device according to claim 1, wherein said first electrically insulating plate is a glass plate, and said second electrically insulating plate is a phosphor coated glass plate.

3. A field emission display device according to claim 1, wherein said cathode is formed of a layer of Ag paste.

4. A field emission display device according to claim 1, wherein said high electrical resistivity material comprises $RuO_2$.

5. A field emission display device according to claim 1, wherein said nanotube emitter layer being formed of a carbon paste comprising between about 20 wt % and about 80 wt % of carbon and the remainder of a solvent-containing binder.

6. A field emission display device according to claim 1, wherein said nanotube emitter layer being formed of a carbon paste comprising about 50 wt % carbon and about 50 wt % solvent-containing binder.

7. A field emission display device according to claim 1, wherein said nanotube emitter layer being formed of a carbon paste comprising about 50 wt % carbon fibers having diameters between about 30 nanometers and about 50 nanometers and about 50 wt % solvent-containing binder.

8. A field emission display device according to claim 1, wherein said emitter stack having a thickness between about 10 $\mu$m and about 100 $\mu$m.

9. A field emission display device according to claim 1, wherein said emitter stack having a thickness preferably between about 20 $\mu$m and about 40 $\mu$m.

10. A field emission display device according to claim 1, wherein said insulating rib section having a thickness substantially similar to a thickness of said emitter stack.

11. A field emission display device according to claim 1, wherein said insulating rib section being formed of a dielectric material.

12. A field emission display device according to claim 1, wherein said dielectric material overlying said multiplicity of emitter stacks comprises a glass powder and a solvent.

13. A field emission display device according to claim 1, wherein said gate electrode being formed of Ag paste.

14. A field emission display device according to claim 1, wherein said dielectric material layer perpendicularly overlying a multiplicity of emitter stacks having a width of about 150 $\mu$m m, said gate electrode on top of said dielectric material layer having a width of about 110 $\mu$m, and said nanotube emitter layer not overlaid by said dielectric material layer having a width of about 120 $\mu$m m and a length of about 110 $\mu$m.

* * * * *